(No Model.)

W. A. CROWDUS.
GALVANIC BATTERY.

No. 450,285. Patented Apr. 14, 1891.

WITNESSES:
John Becker
Fred White

INVENTOR:
Walter Ambus Crowdus,
By his Attorneys,
Arthur C. Fraser & Co.

UNITED STATES PATENT OFFICE.

WALTER AMBUS CROWDUS, OF MEMPHIS, TENNESSEE, ASSIGNOR TO JO. W. ALLISON, TRUSTEE, OF SAME PLACE.

GALVANIC BATTERY.

SPECIFICATION forming part of Letters Patent No. 450,285, dated April 14, 1891.

Application filed October 8, 1890. Serial No. 367,421. (No model.)

*To all whom it may concern:*

Be it known that I, WALTER AMBUS CROWDUS, a citizen of the United States, residing at Memphis, in the State of Tennessee, have invented certain new and useful Improvements in Electric Batteries, of which the following is a specification.

This invention relates to the electrical connections with the plates of galvanic batteries. The connections are made through the bottom of the cell to terminals on the exterior thereof at one side or at the ends. The connections with the plates are so devised as to leave the top of the cell unobstructed, so that they may not interfere with the recharging of the exciting-liquids, and the connection for the positive plate is so made as to enable the plate to be freely lifted out without the necessity of unfastening any connecting parts, so that it may be quickly and easily replaced by a new plate. To this end the plates are connected with binding-posts through the medium of wires or strips passing through the bottom of the cell and traversing a suitable space beneath the cell for connection between the successive cells of a battery or connected series of jars, or in the case of a single cell with binding-posts on the exterior thereof at either side. The connection with the positive plate or electrode is made by providing a metallic trough in the bottom of the cell, into which trough the bottom edge of the electrode is set, so that it is immersed in a bath of mercury placed therein, which serves both to make a good electric contact between the electrode and the metal trough and to protect the latter from the action of the electrolyte.

Figure 1:
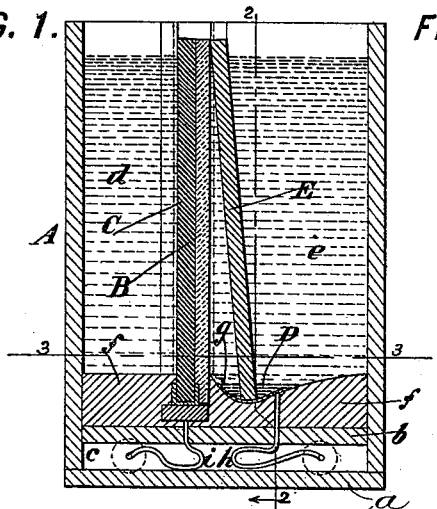
Figure 2:
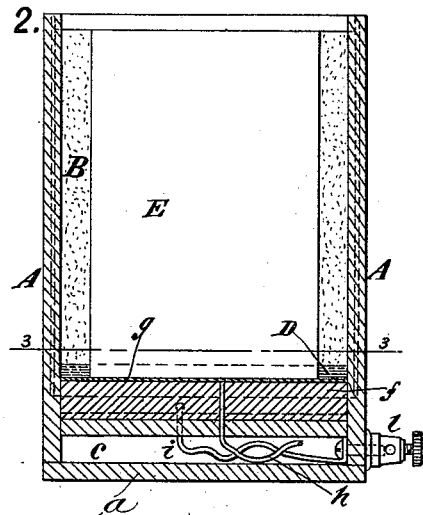
Figure 3:
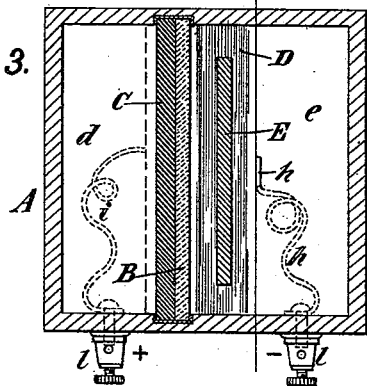
Figure 4:
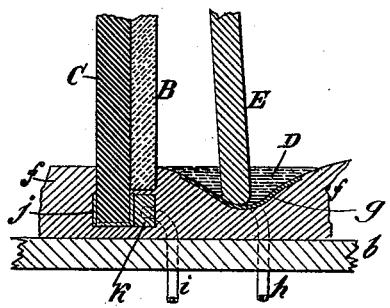
Figure 5:
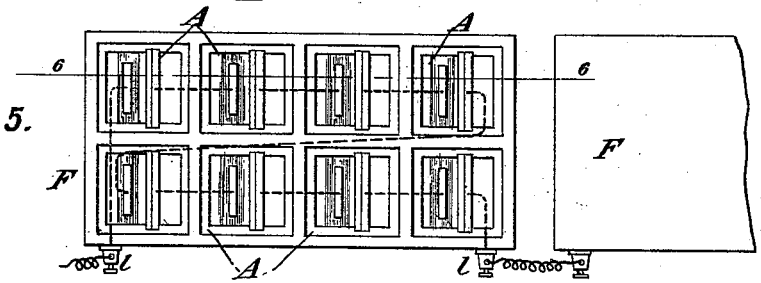
Figure 6:
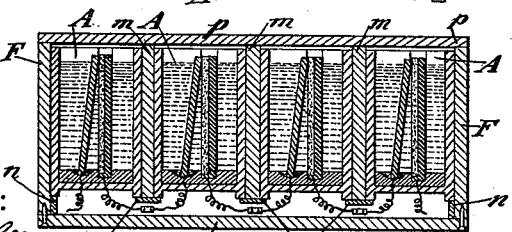

Figure 1 of the accompanying drawings is a vertical transverse section of a battery-cell constructed according to my invention. Fig. 2 is a section thereof in a plane at right angles to Fig. 1, as denoted by the line 2 2. Fig. 3 is a horizontal transverse section in the plane of the line 3 3 in Figs. 1 and 2. Fig. 4 is a fragmentary view on a larger scale, showing the bottom portions of the electrodes and their connections. Fig. 5 is a plan of a case or box containing a battery of cells. Fig. 6 is a section of Fig. 5 in the plane of the line 6 6.

The cell or battery-vessel A may be made of wood, fiber, or other suitable material, impregnated, if necessary, with wax or other impermeable material. It has a removable bottom $a$ and a false bottom $b$, leaving a space $c$ between them for the wire connections. Above the false bottom $b$ the cell is divided by a porous partition B, which may be of unglazed earthenware, as usual, into two chambers $d$ and $e$, in the former of which is placed the electrolyte for the negative plate and in the latter that for the positive plate.

The negative electrode C consists, in the construction shown, of a plate of porous carbon placed in the chamber $d$ close against the porous partition B, so that it co-operates therewith to prevent the mixing of the two electrolytes. The positive plate E, of zinc or other suitable material, is placed in the chamber $e$, and rests with its lower edge in the mercury bath D. The side edges of the plates B and C are supported by being held in grooves in the side walls of the cell, and their connection is made tight by a filling of wax or other impervious material. A wax coating $f$ is also applied on the bottom of the cell, extending beneath the bottoms of the plates B and C.

The mercury-trough D is formed at the lowest portion of the chamber $e$, so that the mercury if displaced therefrom will run back into the trough. It is formed by a trough of metal or other conducting material, as shown at $g$ in Figs. 1 and 4. The connecting-wire $h$ is soldered to the trough and extends down through the bottom $b$.

The mercury seal affords a perfect connection between the metal trough and the electrode and serves to protect the metal of the trough from local action by the exciting-liquid or electrolyte. To this end the mercury seal should be made deep enough to immerse the trough, and thereby prevent access of the liquid to it.

The wire $i$ connects with the bottom of the negative plate C by passing through the bottom $b$, and being soldered or otherwise connected to the plate. If the plate is of carbon, it should have its lower edge electroplated with copper, as shown at $j$ in Fig. 4. A bar $k$, of lead or other metal, may then be easily soldered to one side of this copper rim and the wire $i$ embedded in or soldered to the bar $k$. This bar $k$ may project beneath the bottom of the porous partition B, so that room is provided for it in the grooves in the side walls of the cell A, or it may project to both sides, as shown in Fig. 1, but be made too short to enter the grooves. The wires $h$ and $i$ are carried through the bottom space $c$ to either side or to opposite sides of the cell and pass out through holes for connection with binding-posts $l\, l$, as shown in Figs. 2 and
3. The bottom $a$ is made removable, so that the connections can be properly arranged, and then the bottom be subsequently fastened on. This is the construction for single cells.
For batteries or cases containing a number of cells connected in series the cells are constructed without the bottoms $a$ and are arranged in a suitable box or case, the wire $i$ of one cell being connected to the wire $h$ of the next at the bottom of the case. One suitable arrangement for this purpose is shown in Figs. 5 and 6, where F designates the inclosing case or box subdivided by partitions $m\, m$ into compartments for the reception of the individual cells A A. Ledges $n\, n$ are provided in this box for supporting the bottoms of the cells. The top $p$ and bottom $q$ of the box are made removable, and between the bottom and the ledges $n$ at the bottoms of the partitions $m$ is a space answering the same purpose as the space $c$ in the single cell. The wires $h\, i$ of the cells are carried out through their bottoms and connected together in this space before fastening on the bottom board or plate $q$. One suitable manner of connecting the elements in series is shown by the dotted lines in Fig. 5. The binding-posts $l\, l$, to which the terminals of the opposite ends of the series of cells are connected, are most conveniently arranged on the front of the box at its opposite ends, so that successive boxes or batteries may be conveniently connected together, as shown in Fig. 5.
In my battery the connections are so arranged as to be entirely exterior to the chambers for the electrolytes, so that the electrolytes can be drawn off and replaced without possibility of disturbing the connections.
The positive plate E may also be lifted out for examination or replacement by a new plate with the minimum of trouble. On inserting a new plate it is only necessary to insure that its bottom shall drop into the trough or groove $g$, so as to be immersed in the bath of mercury, which at once insures a perfect connection.

An important advantage of my invention is that the mercury bath D keeps the zinc plate continually amalgamated by creeping up the surfaces of the plate. The advantage of thus amalgamating the zinc is well understood in the art.

The details of the connections and the general arrangement of the battery or cell may be changed considerably without departing from my invention.

My invention is applicable to nearly all forms of batteries, both one-fluid and two-fluid batteries, except gravity-batteries. It will only be necessary to change the mechanical arrangements and details of the connections to adapt it to almost any one of the known types of batteries.

I make herein no claim to the negative electrolyte C of porous carbon being arranged against the porous plate B to co-operate therewith, as a porous diaphragm for preventing the mixture of the electrolytes is thus claimed in another application executed by me coincidently with the present one, patented January 27, 1891, No. 445,425. This arrangement is not essential to my present invention and may be modified or departed from in any manner that experience or judgment may dictate.

I claim as my invention the following defined novel features on improvements, substantially as hereinbefore specified, namely—

The combination, with a battery-cell having a metallic trough in its bottom, of a conductor leading from said trough to the exterior, a bath of mercury in said trough, and an electrode with its bottom portion immersed in the mercury, whereby the mercury forms an electric connection between the electrode and the metallic trough.

In witness whereof I have hereunto signed my name in the presence of two subscribing witnesses.

WALTER AMBUS CROWDUS.

Witnesses:
J. S. FOWLER,
J. L. HUDGINS.